United States Patent
Corl, Jr. et al.

(10) Patent No.: US 6,947,983 B2
(45) Date of Patent: Sep. 20, 2005

(54) METHOD AND SYSTEM FOR EXPLOITING LIKELIHOOD IN FILTER RULE ENFORCEMENT

(75) Inventors: Everett Arthur Corl, Jr., Raleigh, NC (US); Gordon Taylor Davis, Chapel Hill, NC (US); Clark Debs Jeffries, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 758 days.

(21) Appl. No.: 09/887,374

(22) Filed: Jun. 22, 2001

(65) Prior Publication Data

US 2002/0198981 A1 Dec. 26, 2002

(51) Int. Cl.[7] .............................................. G06F 15/173
(52) U.S. Cl. ...................................... 709/224; 709/223
(58) Field of Search ................................ 709/224, 223; 713/201

(56) References Cited

U.S. PATENT DOCUMENTS

| | | | | |
|---|---|---|---|---|
| 5,463,777 A | * | 10/1995 | Bialkowski et al. | 707/102 |
| 5,761,424 A | * | 6/1998 | Adams et al. | 709/217 |
| 5,822,527 A | | 10/1998 | Post | 395/200.36 |
| 5,835,727 A | | 11/1998 | Wong | 395/200.68 |
| 5,848,233 A | | 12/1998 | Radia | 395/187.01 |
| 5,951,651 A | * | 9/1999 | Lakshman et al. | 709/239 |
| 6,009,475 A | | 12/1999 | Shrader | 709/249 |
| 6,088,805 A | | 7/2000 | Davis | 713/202 |
| 6,341,130 B1 | * | 1/2002 | Lakshman et al. | 370/389 |
| 6,606,710 B2 | * | 8/2003 | Krishnan et al. | 713/201 |
| 6,772,347 B1 | * | 8/2004 | Xie et al. | 713/201 |

OTHER PUBLICATIONS

Baboescu, Florin & Varghese, George, "Scalable Packet Classification", Aug. 2001, SIGCOMM '01.*

* cited by examiner

Primary Examiner—Dung C. Dinh
Assistant Examiner—Dohm Chankong
(74) Attorney, Agent, or Firm—Sawyer Law Group LLP (57) ABSTRACT

A method and system for determining whether to enforce a plurality of filter rules for a packet including a key in a computer network is disclosed. Each of the plurality of filter rules has a priority. The method and system include accumulating statistics for each of the plurality of filter rules. The statistics indicate a frequency of enforcement for each of the plurality of filter rules. The method and system also include placing the plurality of filter rules in an order for testing against the key. The order is based on the frequency of each filter rule of the portion of the plurality of filter rules. Consequently, more frequently enforced filter rules may be tested first.

24 Claims, 5 Drawing Sheets

Prior Art

Figure 1A

Prior Art

METHOD AND SYSTEM FOR EXPLOITING LIKELIHOOD IN FILTER RULE ENFORCEMENT

FIELD OF THE INVENTION

The present invention relates to enforcement of filter rules, and more particularly to a method and system for testing filter rules based on the frequency of enforcement.

BACKGROUND OF THE INVENTION

Figure 1A:
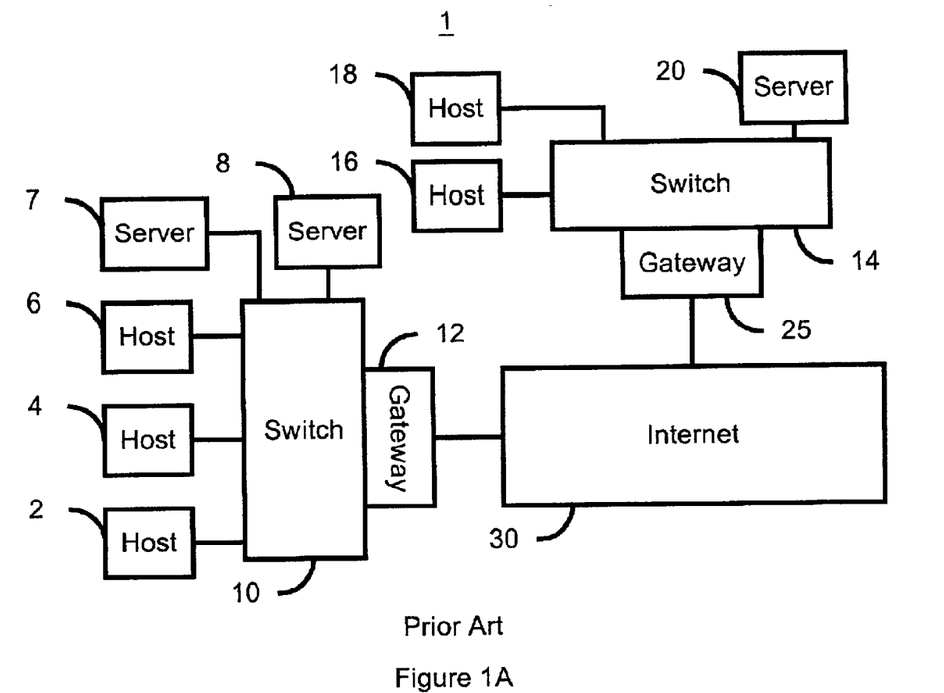
FIG. 1A is a diagram of a conventional computer network.

Driven by increasing usage of a variety of network applications, such as those involving the Internet, computer networks are of increasing interest. FIG. 1A depicts a computer network 1 as coupled to the Internet 30. The computer network 1 includes gateways 12 and 25 as well as switches 10 and 14. The switches 10 and 14 are coupled to hosts 2, 4 and 6 and hosts 16 and 18, respectively. The switches 10 and 14 are also coupled to servers 7 and 8 and server 20, respectively.

Figure 1B:
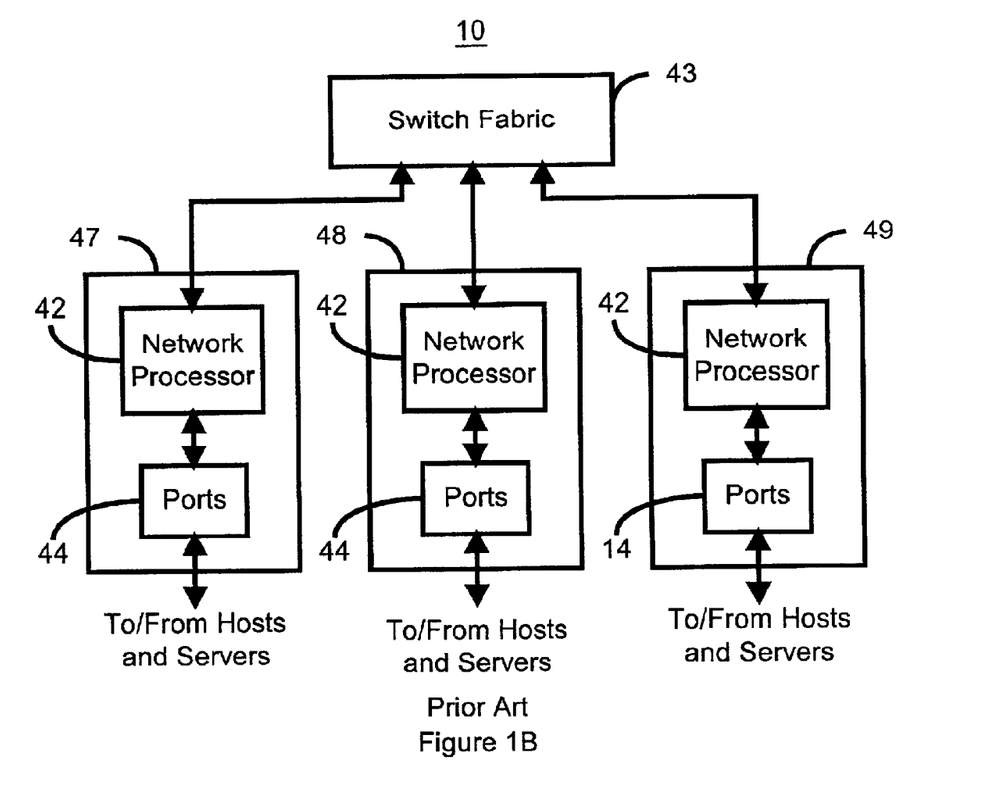
FIG. 1B is a block diagram of a conventional switch.

The switches 10 and 14 are often used to couple portions of the network 1 together, as well as to couple different networks together. FIG. 1B depicts a high-level block diagram of a switch 10 which can be used in a computer network such as the network 1. The switch 10 includes a switch fabric 43 coupled with blades 47, 48 and 49. Each blade 47, 48 and 49 is generally a circuit board and includes at least a network processor 42 coupled with ports 44. Thus, the ports 44 are coupled with hosts and servers (not shown in FIG. 1B). The blades 47, 48 and 49 can provide traffic to the switch fabric 43 and accept traffic from the switch fabric 43. Thus, any host connected with one of the blades 47, 48 or 49 can communicate with another host connected to another blade 47, 48 or 49 or connected to the same blade. Although shown only in the switch 10, the network processor 42 may also be used in a router or other mechanism for transmitting packets.

In order to manage communications in a network, the network processor filter rules are used. In general, the network processor 42 determines how to enforce filter rules. A filter rule tests packets which are being transmitted via a network in order to provide a variety of services. A filter rule may test packets entering the network from an outside source to ensure that attempts to break into the network can be thwarted. For example, traffic from the Internet entering the network of the switch 10 may be tested in order to ensure that packets from unauthorized sources are denied entrance. Similarly, packets from one portion of a network may be prevented from accessing another portion of the network. For example, a packet from some of the hosts (not explicitly shown in FIG. 1B) may be prevented access to either a server (not shown in FIG. 1B) or another host. The fact that the host attempted to contact the server may also be recorded so that appropriate action can be taken by the owner of the network. Filter rules may also be used to transmit traffic based on the priorities of packets. For example, packets from a particular host may be transmitted because the packets have higher priority even when packets from other hosts may be dropped. Filter rules may also be used to ensure that new sessions are not permitted to be started when congestion is high even though traffic from established sessions is transmitted. Other functions could be achieved based on the filter rule.

Filter rules test a key in order to determine whether the filter rule will operate on a particular packet. The key that is typically used includes fields from the Internet Protocol (IP) header and the TCP/UDP header of the packet. These headers typically contain five fields (five tuple) of interest: the IP source address, the IP destination address, the TCP/UDP destination port, the TCP/UDP source port, and the protocol. These fields are typically thirty-two bits, thirty-two bits, sixteen bits, sixteen bits and eight bits, respectively. Thus, the part of IP header of interest is typically one hundred and four bits in length. Filter rules typically utilize these one hundred and four bits, and possible more bits, in order to perform their functions. For example, based on the source and destination addresses, the filter rule may determine whether a packet from a particular host is allowed to reach a particular destination address.

Furthermore, the key often contains additional bits. For example, a TCP SYN (start of session) packet, which starts a session, may need to be handled differently than a TCP packet for an existing session. The TCP header's SYN flag can be included in the key to distinguish between these two types of packets. When the network is congested, a filter rule may proactively drop the TCP SYN packet while allowing the TCP packets for existing sessions to be transmitted. These operations allow the network to continue to operate and help reduce congestion. In order to perform this function, however, the filter rule key must contain the TCP header's SYN flag in order to distinguish between these two types of packets.

Filter rules typically utilize one or more ranges of values to test one or more fields of a key. For example, if a key utilizes the five tuple described earlier, the criteria for the filter rule would typically include a range of values for one or more of these five fields. Range fields are typically expressed in terms of a lower and upper boundaries.

In general, in order to determine which rules from a set of filter rules to apply to a particular packet, the key for the packet is tested against the filter rules for the network 1. Exact comparisons are made between the rule and packet for non-range key fields. Fields in the key which are expressed in terms of ranges must be tested to determine if the packet's value for that field falls within the range specified by the rule.

Filter rules can interact based on the priority for the filter rule. Suppose that two filter rules are defined such that they intersect, where the first filter rule is an exception to the second filter rule. A packet matching the first filter rule would also match the second filter rule. A packet matching the second filter rule will not necessarily match the first filter rule. The second filter rule can be viewed as a default rule. In such a case, the first filter rule must be of higher priority than the second filter rule to ensure that when a packet matches both filter rules that the first filter rule dominates.

Figure 2:
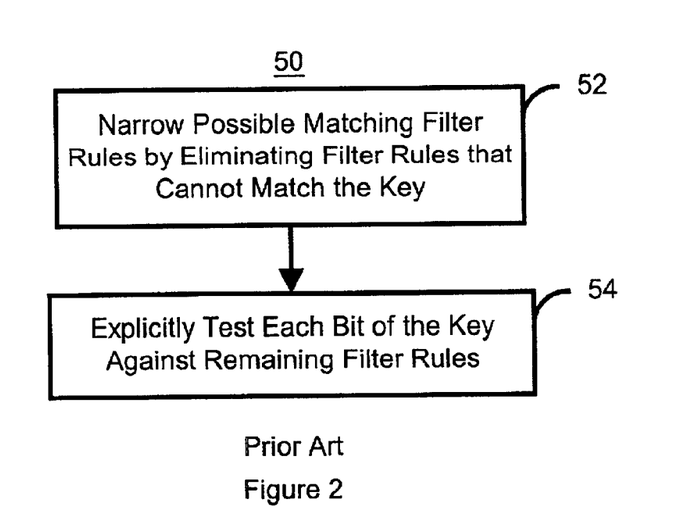
FIG. 2 is a flow chart depicting a conventional method for determining which filter rules to enforce for a particular key.

FIG. 2 depicts a high-level flow chart of a conventional method 50 for determining which, if any, filter rules to enforce for a particular packet. The method 50 is described more fully in co-pending U.S. patent application Ser. No. 09/312148 entitled "System and Method and Computer Program for Filtering Using Tree Structure" (RAL919990006US4) filed on Oct. 19, 1999 and assigned to the assignee of the present invention. Applicant hereby incorporates by reference the above-mentioned co-pending patent application. The method 50 is typically performed by the network processor 42. The possible filter rules which can match the key are narrowed to a set of remaining filter rules. This is done via step 52 which eliminates rules which cannot match the key. Step 52 can be accomplished using a decision tree. A decision tree contains nodes which perform a test, branches which indicate where in the decision tree to go based on the test, and leaves which correspond to some number of filter rules. At each node of the decision tree, a single bit of the key is tested. Based on the results of a test at a node, a different branch is taken. The branch can lead to another node or to a leaf. Each node thus excludes some of the filter rules from being enforced against the packet. The process of testing individual bits of the key is continued until a leaf in the decision tree is reached. The leaf includes one or more filter rules which cannot be distinguished by further testing of individual bits. If the leaf includes a single filter rule, then this filter rule may be enforced for the packet. However, if the leaf includes multiple filter rules, then it must be determined which, if any, of these remaining filter rules match the key.

It is determined which, if any, of the remaining filter rules match the key, typically by testing the entire key against each of the remaining filter rules, via step 54. Thus, step 54 uses brute force to determine whether any filter rule matches the key by testing (exact or range as appropriate) all bits of the key against the filter rules. Consequently, step 54 can determine precisely which filter rules, if any, match the key and are to be enforced against the packet.

Although the method 50 functions, one of ordinary skill in the art will readily recognize that the method 50 is time consuming. The remaining filter rules tested in step 54 may include a large number of filter rules. Step 54 tests all bits of the key against each of the remaining filter until a filter rule matching the key is found. Testing each bit of the key against a single filter rule requires a relatively large amount of time as compared to a single bit test carried out in step 52. In addition, the order in which the key is tested against the remaining filter rules in step 54 may result in the key being tested against the matching filter rule near the end set of the remaining filter rules. Thus, the key may frequently be tested against a large number of filter rules which do not match the key. The test of the key against each of these (non-matching) filter rules requires a relatively large amount of time, resulting in additional delays. Thus, even when step 52 is optimized to rapidly obtain the set of remaining filter rules, performing step 54 to identify the filter rule(s) that exactly match the key may result in delays.

Accordingly, what is needed is a system and method for more efficiently testing keys. The present invention addresses such a need.

SUMMARY OF THE INVENTION

The present invention provides a method and system for determining whether to enforce a plurality of filter rules for a packet including a key in a computer network. Each of the plurality of filter rules has a priority. The method and system comprise accumulating statistics for each of the plurality of filter rules. The statistics indicate a frequency of enforcement for each of the plurality of filter rules. The method and system also comprise placing the plurality of filter rules in an order for testing against the key. The order is based on the frequency of each filter rule of the portion of the plurality of filter rules.

According to the system and method disclosed herein, the present invention provides a mechanism for determining the order in which the filter rules are tested. Thus, filter rules having a higher frequency of enforcement may be tested first. A match between a filter rule and the key may be more rapidly achieved. Thus, time may be saved in testing filter rules.

DETAILED DESCRIPTION OF THE INVENTION

The present invention relates to an improvement in transmission of packets in a computer network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for determining whether to enforce a plurality of filter rules for a packet including a key in a computer network. Each of the plurality of filter rules has a priority. The method and system comprise accumulating statistics for each of the plurality of filter rules. The priority of a filter rule could, for example be determined using a method described in co-pending U.S. patent application Ser. No. 09/540333 entitled System Method and Computer Program for Prioritizing Filter Rules" (RAL919990048US1) filed on Mar. 31, 2000 and assigned to the assignee of the present application. Applicant hereby incorporates by reference the above-mentioned co-pending patent application. The statistics indicate a frequency of enforcement for each of the plurality of filter rules. The method and system also comprise placing the plurality of filter rules in an order for testing against the key. The order is based on the frequency of each filter rule of the portion of the plurality of filter rules.

The present invention will be described in terms of a particular network processor in a switch. However, one of ordinary skill in the art will readily recognize that the method and system operate effectively when used in a different network processor or for a network processor in another component, such as a router. The present invention is also described in the context of certain methods having particular steps. In addition, one of ordinary skill in the art will readily realize that, for clarity, certain steps have been omitted. Thus, the method and system in accordance with the present invention are consistent with other or additional steps.

Figure 3:
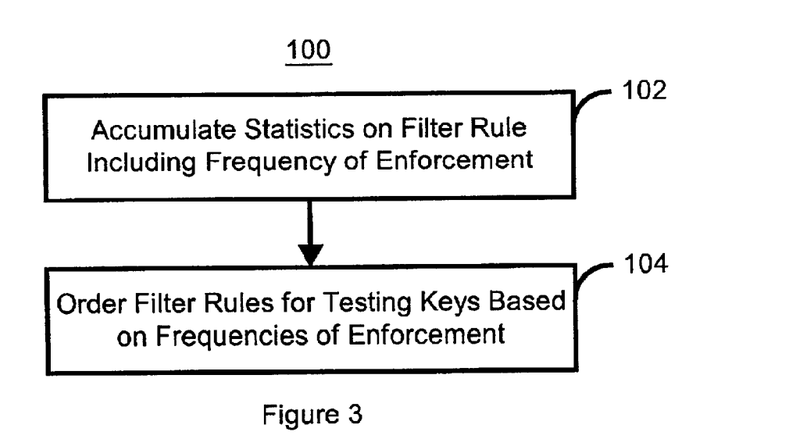
FIG. 3 is a high-level flow chart depicting one embodiment of a method in accordance with the present invention for ordering filter rules for testing of a key.

To more particularly illustrate the method and system in accordance with the present invention, refer now to FIG. 3, depicting one embodiment of a method 100 in accordance with the present invention for ordering filter rules for testing of a key. The method 100 is preferably used in a network processor, such as the network processor 42 of FIG. 1B. Consequently, the method 100 of FIG. 3 will be described in conjunction with the network 1, the switch 10 and the network processor 42. However, one of ordinary skill in the art will readily recognize that the method 100 is consistent with other components performing some of the functions of the network processor 42 as well as other portions of a network.

The method 100 is preferably used for subsets of the filter rules which are enforceable by the network processor 42. These subsets of filter rules have preferably been determined in a faster test, for example a test which tests one bit of the key against one bit of the ranges for the filter rules. Thus, the method 100 is preferably used for filter rules which have been obtained by another, faster test that narrows the filter rules which the key for a packet can match to a smaller number of remaining filter rules. The method 100, therefore, is used to facilitate the step 54 of the conventional method 50 depicted in FIG. 2. In a preferred embodiment, the method 100 is used for each set of remaining filter rules that cannot be distinguished using a single bit test. Thus, the method 100 is preferably used for filter rules that are on the "leaves" of the decision tree used in step 52 of the conventional method 50. In addition, the method 100 is preferably used for sets of filter rules which have the same priority. The method 100 is thus preferably repeated for each set of filter rules having the same priority in a leaf of the decision tree used in step 52 of the conventional method 50.

Referring back to FIGS. 3, 1A and 1B, statistics are collected on the filter rules, via step 102. The statistics include the number of times each filter rule is enforced. Thus, the frequency of enforcement for each of the filter rules can be determined using the statistics obtained in step 102. The filter rules are placed in an order based upon their frequencies of enforcement, via step 104. The order preferably places higher frequency filter rules first, so that the filter rules that are enforced more often will be tested first. The order preferably places the remaining rules in order of their frequency. In another embodiment, the performance of the network processor 42 is also accounted for when placing the filter rules in step 104. For example, a particular filter rule may affect the quality of service provided by the network processor 42 for the packet. Suppose that the particular filter rule is used to ensure a higher quality of service for packets having keys matching the ranges for the filter rule and that the filter rule has a low frequency for enforcement. Such a rule would be placed near the beginning of the order despite the fact that it has a low frequency of enforcement. Step 104, therefore, preferably accounts for both the frequencies of enforcement for the plurality of filter rules and performance of the network.

Thus, using the method 100 the filter rules of the same priority number can be placed in an order for testing based on the frequencies of the filter rules. When the key is tested against the filter rules, filter rules of the same priority can be tested in this order. The key can thus be tested against more frequently enforced rules first. As a result, it is more likely that the filter rules which match the key, if any, will be more rapidly found. Consequently, time may be saved and the network processor 42 can function more efficiently. In addition, performance of the network processor 42 can also be accounted for in ordering the filter rules for testing. Time may be saved and the performance of the network processor 42 improved using the method 100.

Figure 4:
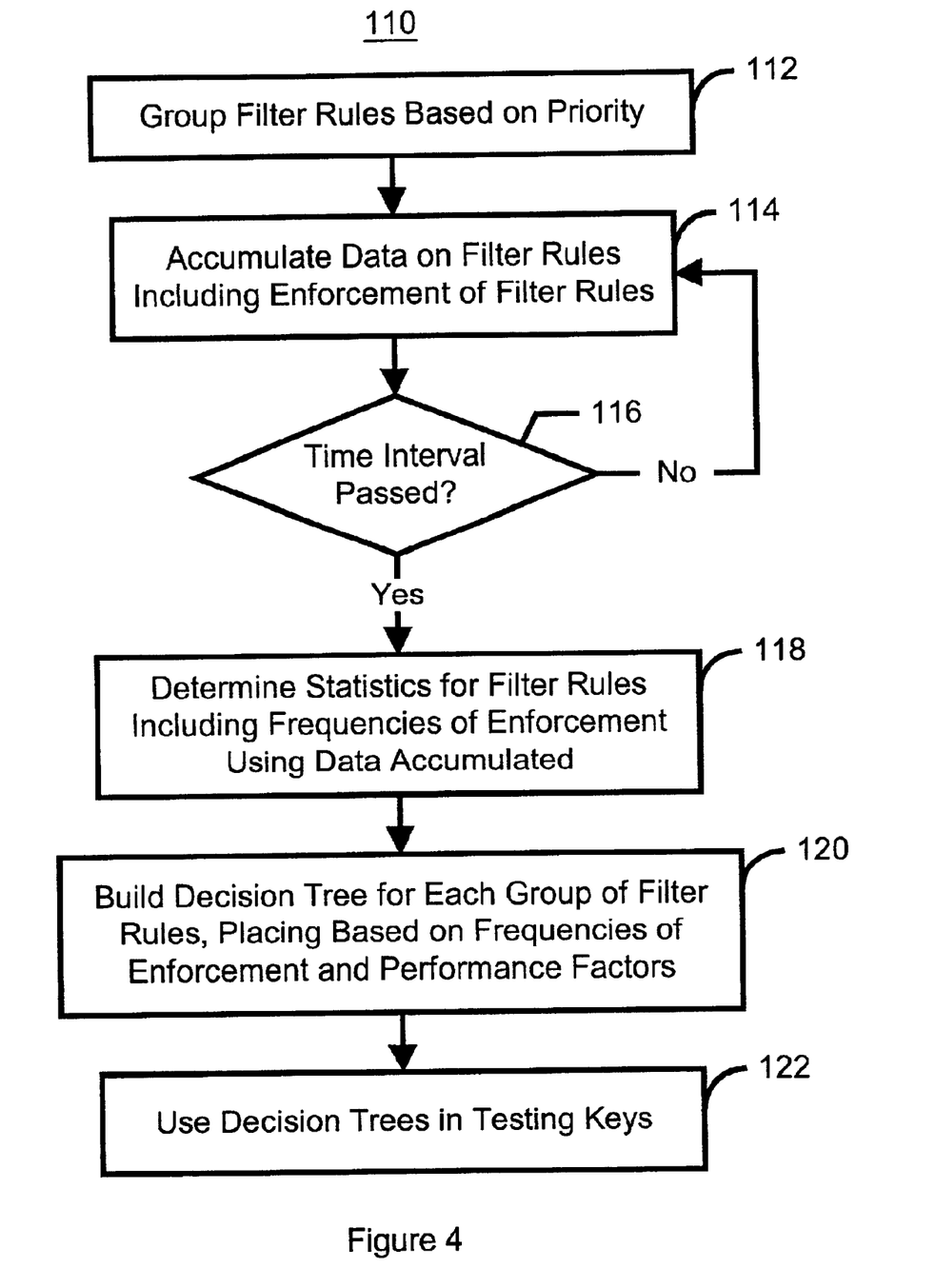
FIG. 4 is a more detailed flow chart of one embodiment of a method in accordance with the present invention for determining which filter rules to enforce for a key.

FIG. 4 is a more detailed flow chart of one embodiment of a method 110 in accordance with the present invention for ordering filter rules for testing of a key and determining which of the filter rules to test against the key. The method 110 is preferably used in a network processor, such as the network processor 42 of FIG. 1B. Consequently, the method 110 of FIG. 4 will be described in conjunction with the network 1, the switch 10 and the network processor 42. However, one of ordinary skill in the art will readily recognize that the method 110 is consistent with other components performing some of the functions of the network processor 42 as well as other portions of a network.

The method 110 is preferably used for subsets of the filter rules which are enforceable by the network processor 42. These subsets filter rules have preferably been determined in a faster test, for example one which tests only one bit of the key against one bit of the ranges for the filter rules. Thus, the method 110 is preferably used for filter rules which have been obtained by another, faster test that narrows the filter rules which the key for a packet can match to a smaller number of remaining filter rules. The method 110, therefore, is used to facilitate the step 54 of the conventional method 50 depicted in FIG. 2. In a preferred embodiment, the method 110 is used for remaining filter rules that cannot be distinguished using a single bit test. Thus, the method 110 is preferably used for filter rules that are on the "leaves" of a decision tree used in step 52 of the conventional method 50.

Referring back to FIGS. 4, 1A and 1B, for each set of remaining filter rules (filter rules on each leaf of the decision tree used in step 52 of the conventional method 50), the filter rules are grouped based on their priority, via step 112. These groupings determine the filter rules which will be ordered together. Consequently, groups of filter rules having the same priority will be ordered together using the method 110. Data for statistics are accumulated for the filter rules during operation of the network processor 42, via step 114. The data include information related to the frequency of enforcement for each of the filter rules, such as the number of times a particular filter rule is enforced and the total number of packets. It is determined if a particular time interval has passed, via step 116. If not, then data for the statistics are continued to be accumulated in step 114. If the time interval has passed, then statistics for the filter rules are determined using the data accumulated in step 114, via step 118. Step 118 includes determining the frequencies with which each of the filter rules is enforced.

A decision tree is built/rebuilt for each of the groups of filter rules, via step 120. The node of the decision tree in which each filter rule is positioned is based on the frequency of enforcement for the filter rule and, in a preferred embodiment, on performance factors for the network processor that are related to the filter rule. In general, filter rules are placed in the decision tree in order of their frequencies, with filter rules having a higher frequency of enforcement being placed at the start of the decision tree. However, the performance of the network processor 42, for example in ensuring that a particular level of service is maintained as described above, may also be accounted for in placing the filter rules in the decision tree. Thus, step 120 provides a decision tree for each group of filter rules determined in step 112. Each node of the decision trees provided in step 120 corresponds to a bit by bit test of the key against the filter rule at that node. Thus, the decision tree provided in step 120 is more akin to a leaf chain, with a leaf (a single filter rule) and a branch from each node.

Figure 5:
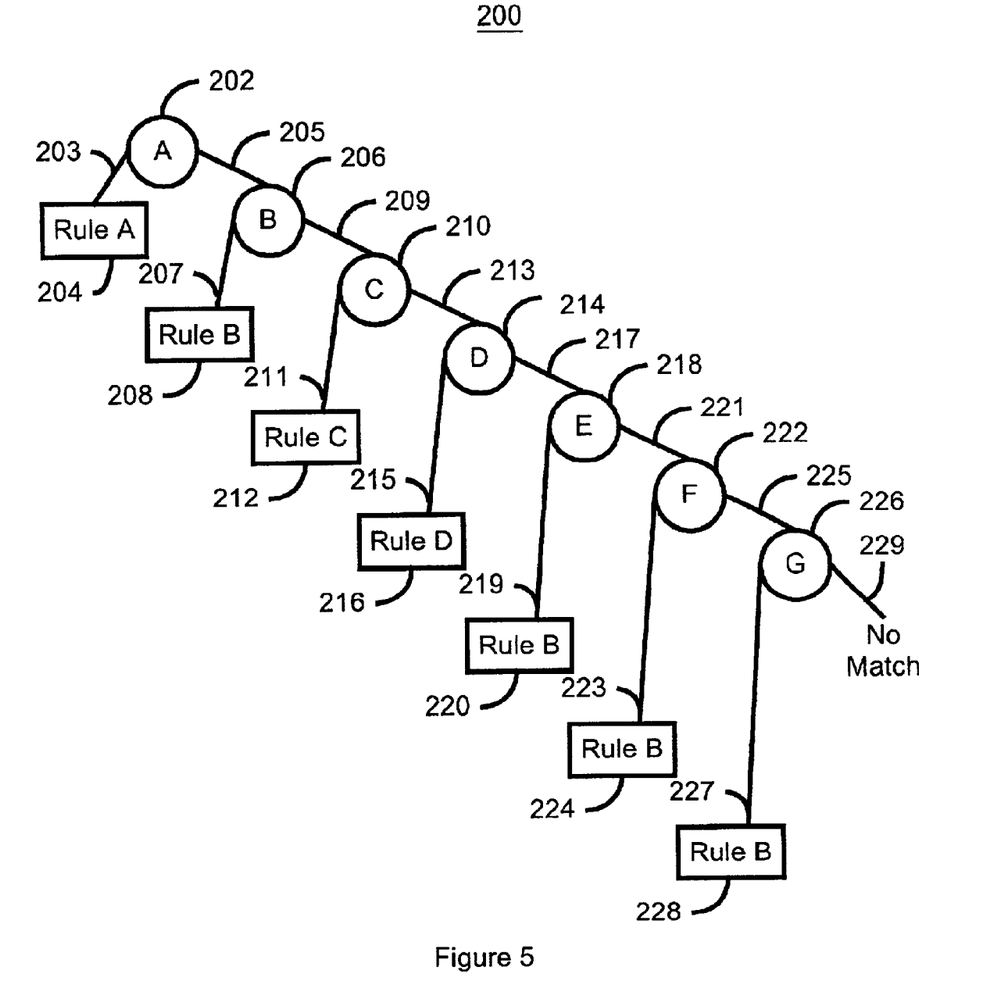
FIG. 5 is a diagram of one embodiment of a decision tree in accordance with the present invention.

FIG. 5 depicts one such decision tree 200 provided in step 120 for a group of seven filter rules, filter rule A through filter rule G. Filter Rule A has the highest frequency, filter rule B has the next highest filter rule, and so on, with filter rule G having the lowest frequency. Thus, filter rules A, B, C, D, E, F and G are tested at nodes 202, 206, 210, 214, 218, 222 and 226, respectively. Branches 203, 207, 211, 215, 219, 223 and 227 lead to leaves 204, 208, 212, 216, 220, 224 and 228, respectively. The branches 203, 207, 211, 215, 219, 223 and 227 are taken if the filter rule A, B, C, D, E, F and G, respectively are found to match the key at nodes 202, 206, 210, 214, 218, 222 and 226, respectively. Branches 205, 209, 213, 217, 221, 225 and 229 are taken if the key does not match the filter rules at nodes 202, 206, 210, 214, 218, 222 and 226, respectively.

Referring back to FIG. 4, the decision trees are then used in testing keys for packets during operation of the network processor 42, via step 122. The key for the packet is explicitly tested against the ranges for the filter rules in step 122. Thus, a portion of the tree 200 may be traversed in step 122 to find any filter rules which match the key. During operation, statistics are again accumulated, via step 114. The steps 114 through 122 may thus be repeated throughout use of the network processor 42, thereby updating the decision trees provided in step 120. Note that although steps 114 and 122 are in a sequence, these steps occur in parallel. Thus, statistics are obtained while the network processor 42 and the decision trees provided in step 120 are used to test the keys for packets against the filter rules.

Thus, the method 110 allows the filter rules to be placed in an order based on their frequency. A key for a packet is tested against the filter rules in this order. Consequently, filter rules having a higher frequency of enforcement, and thus a higher likelihood of being enforced, are tested first. Once a match in a particular group of filter rules having the same priority is found, subsequent rules in the group need not be tested. As a result, time is likely to be saved in determining which filter rule is to be enforced for the packet. In addition, the frequencies of enforcement for the filter rules are updated during operation of the network processor 42. Thus, changes in the traffic through the network processor 42 and the resulting changes in the frequencies of enforcement for filter rules can be accounted for. The method 110 is, therefore, dynamic and can respond to changes in the computer network of which the network processor 42 is a part.

Figure 6:
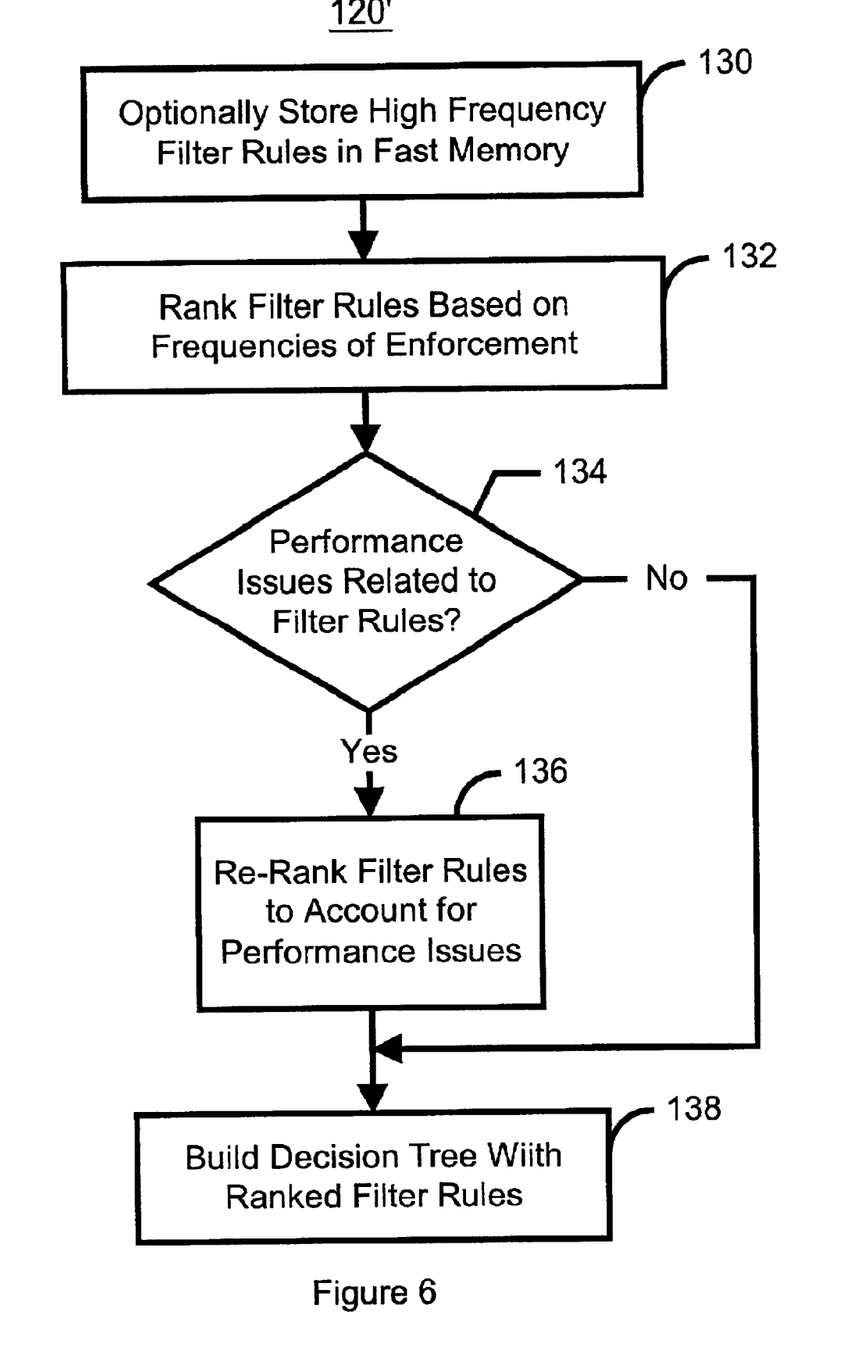
FIG. 6 is a more detailed flow chart of one embodiment of a method in accordance with the present invention for determining the order in which filter rules are to be tested.

FIG. 6 is a more detailed flow chart of one embodiment of a method 120' in accordance with the present invention for determining the order in which filter rules are to be tested. Thus, the method 120' may be used in performing the step 120 of the method 110 depicted in FIG. 4. Referring back to FIG. 6, the method 120' is preferably used in a network processor, such as the network processor 42 of FIG. 1B. Consequently, the method 120' of FIG. 6 will be described in conjunction with the network 1, the switch 10 and the network processor 42. However, one of ordinary skill in the art will readily recognize that the method 120' is consistent with other components performing some of the functions of the network processor 42 as well as other portions of a network.

Referring to FIGS. 6, 1A and 1B, a portion of the filter rules having a high frequency are optionally placed in a fast memory, via step 130. Step 130 can only be performed if a fast memory is available to the network processor 42. The filter rules are ranked based on their frequency alone, via step 132. It is then determined whether there are performance issues related to the filter rules, via step 134. One example of such an issue is the ability of a filter rule having a low frequency of enforcement to provide a highest quality of service. If such performance issues exist, then the order of the filter rules is changed to accommodate the performance issues, via step 136. The decision tree is built with the order obtained in step 136 if performance issues existed or the order obtained in step 132 if there are no performance issues, via step 138. Thus, a decision tree, such as the decision tree 200, can be provided for use in the method 100 or 110.

A method and system has been disclosed for determining which filter rules are to be enforced for a particular packet. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for determining whether to enforce a plurality of filter rules for a packet including a key in a computer network, each of the plurality of filter rules having a priority, the method comprising:

dividing the plurality of filter rules into a plurality of groups based on the priority of each of the plurality of filter rules, each of the plurality of filter rules in each of the plurality of groups having a priority that is equal;

accumulating statistics for each of the plurality of filter rules, the statistics indicating a frequency of enforcement for each of the plurality of filter rules; and placing the plurality of filter rules in an order in each group for testing against the key, the order being based on the frequency of each filter rule of the plurality of filter rules.

2. The method of claim 1 wherein the ordering step further includes:

providing a decision tree for testing the plurality of filter rules, the decision tree being configured based on the frequency of each of the plurality of filter rules and so that the plurality of filter rules can be tested in the order, a first portion of the plurality of filter rules having at least one higher priority being placed higher in the tree.

3. The method of claim 2 wherein the decision tree providing step further includes:

rebuilding the decision tree after the expiration of an interval of time.

4. The method of claim 3 wherein the interval of time is determined based on a determination of how frequently a second portion of the plurality of filter rules is enforced.

5. The method of claim 4 wherein the interval of time decreases when the first portion of the plurality of filter rules are accessed less frequently than a third portion of the plurality of filter rules.

6. The method of claim 3 when the interval of time is determined based on a previous interval of time.

7. The method of claim 3 wherein the computer network further includes a network processor and wherein the rebuilding further includes:

placing the plurality of filter rules in the decision tree based on the priority of each of the plurality of filter rules and at least one performance factor of the network processor.

8. A system for determining whether to enforce a plurality of filter rules for a packet including a key in a computer network, each of the plurality of filter rules having a priority, the system comprising:

at least one network processor for dividing the plurality of filter rules into a plurality of groups based on the priority of each of the plurality of filter rules, each of the plurality of filter rules in each of the plurality of groups having a priority that is equal, accumulating statistics for each of the plurality of filter rules, the statistics indicating a frequency of enforcement for each of the plurality of filter rules and testing a portion of the plurality of filter rules in each group against the key in an order for the group, the order being based on the frequency of each filter rule of the portion of the plurality of filter rules; and at least one memory for storing the plurality of filter rules.

9. The system of claim 8 further comprising:

a decision tree for testing the plurality of filter rules, the decision tree being configured based on the frequency of each of the plurality of filter rules and so that the network processor tests portion of the plurality of filter rules in the order, a first portion of the plurality of filter rules having at least one higher priority being placed higher in the tree.

10. The system of claim 9 wherein the decision tree is rebuilt after the expiration of an interval of time.

11. The system of claim 10 wherein the interval of time is determined based on a determination of how frequently a second portion of the plurality of filter rules is enforced.

12. The system of claim 11 wherein the interval of time decreases when the first portion of the plurality of filter rules are accessed less frequently than a third portion of the plurality of filter rules.

13. The system of claim 10 when the interval of time is determined based on a previous interval of time.

14. The system of claim 10 wherein the plurality of filter rules is placed in the decision tree based on the priority of each of the plurality of filter rules and at least one performance factor of the network processor.

15. The system of claim 8 wherein the at least one memory includes a fast memory and wherein a first portion of the plurality of filter rules are placed in the fast memory, each of the first portion of the plurality of filter rules having a higher priority.

16. A switch for use in a computer network, the switch determining whether to enforce a plurality of filter rules for a packet including a key, each of the plurality of filter rules having a priority, the switch comprising:

at least one network processor for dividing the plurality of filter rules into a plurality of groups based on the priority of each of the plurality of filter rules, each of the plurality of filter rules in each of the plurality of groups having a priority that is equal, accumulating statistics for each of the plurality of filter rules, the statistics indicating a frequency of enforcement for each of the plurality of filter rules and testing a portion of the plurality of filter rules in each group against the key in an order for the group, the order being based on the frequency of each filter rule of the portion of the plurality of filter rules;

at least one memory for storing the plurality of filter rules; and a switch fabric coupling the at least one network processor.

17. A computer-readable medium including a program for determining whether to enforce a plurality of filter rules for a packet including a key in a computer network, each of the plurality of filter rules having a priority, the program including instructions for:

dividing the plurality of filter rules into a plurality of groups based on the priority of each of the plurality of filter rules, each of the plurality of filter rules in each of the plurality of groups having a priority that is equal;

accumulating statistics for each of the plurality of filter rules, the statistics indicating a frequency of enforcement for each of the plurality of filter rules; and placing the plurality of filter rules in an order in each group for testing against the key, the order being based on the frequency of each filter rule of the plurality of filter rules.

18. The computer-readable medium of claim 17 wherein placing instructions further includes instructions for:

providing a decision tree for testing the plurality of filter rules, the decision tree being configured based on the frequency of each of the plurality of filter rules and so that the plurality of filter rules can be tested in the order, a first portion of the plurality of filter rules having at least one higher priority being placed higher in the tree.

19. The computer-readable medium of claim 18 wherein the decision tree providing instructions further includes instructions for:

rebuilding the decision tree after the expiration of an interval of time.

20. The computer-readable medium of claim 19 wherein the interval of time is determined based on a determination of how frequently a second portion of the plurality of filter rules is enforced.

21. The computer-readable medium of claim 20 wherein the interval of time decreases when the first portion of the plurality of filter rules are accessed less frequently than a third portion of the plurality of filter rules.

22. The computer-readable medium of claim 19 when the interval of time is determined based on a previous interval of time.

23. The computer-readable medium of claim 19 wherein the computer network further includes a network processor and wherein the rebuilding instructions further includes instructions for:

placing the plurality of filter rules in the decision tree based on the priority of each of the plurality of filter rules and at least one performance factor of the network processor.

24. A method for determining whether to enforce a plurality of filter rules for a packet including a key in a computer network, each of the plurality of filter rules having a priority, the method comprising:

dividing the plurality of filter rules into a plurality of groups based on the priority of each of the plurality of filter rules, each of the plurality of filter rules in each of the plurality of groups having a priority that is equal;

accumulating statistics for each of the plurality of filter rules, the statistics indicating a frequency of enforcement for each of the plurality of filter rules; and testing a portion of the plurality of filter rules in each group against the key in an order for that group, the order being based on the frequency of each filter rule of the portion of the plurality of filter rules.

* * * * *